(12) United States Patent
Subramanian (10) Patent No.: US 10,554,412 B2
(45) Date of Patent: Feb. 4, 2020

(54) METHOD AND NETWORK TO IMPLEMENT DECENTRALIZED VALIDATION AND AUTHENTICATION MECHANISMS TO PREVENT ADS-B CYBER-ATTACKS

(71) Applicant: Robust Analytics, Inc., Crofton, MD (US)

(72) Inventor: Shreyas Subramanian, Crofton, MD (US)

(73) Assignee: ROBUST ANALYTICS, INC., Crofton, MD (US)

( * ) Notice: Subject to any disclaimer, the term of this patent is extended or adjusted under 35 U.S.C. 154(b) by 0 days.

(21) Appl. No.: 15/913,383

(22) Filed: Mar. 6, 2018

(65) Prior Publication Data

US 2019/0280870 A1    Sep. 12, 2019

(51) Int. Cl.
| | |
|---|---|
| H04L 9/32 | (2006.01) |
| G06Q 20/32 | (2012.01) |
| H04L 9/06 | (2006.01) |
| H04L 29/06 | (2006.01) |
| G08G 5/04 | (2006.01) |
| H04L 29/08 | (2006.01) |
| H04B 7/185 | (2006.01) |

(52) U.S. Cl.
CPC ......... *H04L 9/3236* (2013.01); *G06Q 20/325* (2013.01); *G08G 5/045* (2013.01); *H04L 9/0637* (2013.01); *H04L 9/3239* (2013.01); *H04L 63/08* (2013.01); *H04L 63/12* (2013.01); *H04B 7/18506* (2013.01); *H04L 67/10* (2013.01); *H04L 2209/38* (2013.01); *H04L 2209/80* (2013.01); *H04L 2209/84* (2013.01)

(58) Field of Classification Search
CPC ...................................................... H04L 9/3236
See application file for complete search history.

(56) References Cited

U.S. PATENT DOCUMENTS

| | | | |
|---|---|---|---|
| 7,383,124 B1 | 6/2008 | Vesel | 701/200 |
| 7,423,590 B2 | 9/2008 | Smith | 342/450 |
| 7,495,612 B2 | 2/2009 | Smith | 342/450 |
| 7,570,214 B2 | 8/2009 | Smith et al. | 342/463 |
| 7,612,716 B2 | 11/2009 | Smith et al. | 342/454 |
| 7,730,307 B2 | 6/2010 | Viggiano et al. | 713/168 |

(Continued)

FOREIGN PATENT DOCUMENTS

CN    103413463 A    11/2013

OTHER PUBLICATIONS

Charles Noyes, "BitAV: Fast Anti-Malware by Distributed Blockchain Consensus and Feedforward Scanning", Jan. 7, 2016 (Jan. 7, 2016), XP055557844, Retrieved from the Internet: URL:https://arxiv.org/pdf/1601.01405.pdf, [retrieved on Jan. 7, 2016].

(Continued)

*Primary Examiner* — Jason Chiang
(74) *Attorney, Agent, or Firm* — Stein IP, LLC (57) ABSTRACT

A method or network that addresses cybersecurity vulnerabilities in an ADS-B network by validating and authenticating ADS-B messages. Nodes of the network maintain a validated ledger of ADS-B transactions and use validated information from this ledger to improve security against common cybersecurity attacks including, but not limited to, denial of service attacks, jamming attacks, spoofing attacks, flooding attacks and eavesdropping.

15 Claims, 4 Drawing Sheets

(56) References Cited

U.S. PATENT DOCUMENTS

| | | | |
|---|---|---|---|
| 7,876,259 | B2 | 1/2011 | Schuchman ............. 342/37 |
| 9,052,375 | B2 | 6/2015 | Sampigethaya et al. |
| 9,116,240 | B2 | 8/2015 | Hall |
| 9,824,031 | B1* | 11/2017 | Ganti ............. G06F 21/00 |
| 9,858,781 | B1* | 1/2018 | Campero ............. G06F 9/451 |
| 2015/0212206 | A1 | 7/2015 | Lee et al. |
| 2017/0075941 | A1* | 3/2017 | Finlow-Bates ....... H04L 67/104 |
| 2017/0230189 | A1* | 8/2017 | Toll ............. G06Q 40/04 |
| 2017/0344435 | A1 | 11/2017 | Davis |
| 2017/0344987 | A1* | 11/2017 | Davis ............. H04L 63/06 |
| 2017/0347253 | A1* | 11/2017 | Clawsie ............. H04W 8/005 |
| 2018/0121909 | A1* | 5/2018 | Christidis ............. G06Q 20/383 |
| 2018/0220278 | A1* | 8/2018 | Tal ............. H04W 4/38 |
| 2018/0225651 | A1* | 8/2018 | Stone ............. G06Q 20/085 |
| 2018/0374283 | A1* | 12/2018 | Pickover ............. G07C 5/085 |
| 2019/0012752 | A1* | 1/2019 | Rockafellow ....... G06Q 50/184 |
| 2019/0034465 | A1* | 1/2019 | Shimamura ......... G06F 16/2474 |

OTHER PUBLICATIONS

Jared Dirkmaat: "Aircraft Interface Devices: On board Data Crunchers, FB Extender", Avionics Digital, Apr. 2017 (Apr. 2017), XP055504569, Retrieved from the Internet: URL:http://interactive.aviationtoday.com/a vionicsmagazine/april-May-2017/aircraft-interface-devices-onboard-data-cruncher-efbextender/ [retrieved on Sep. 5, 2018] p. 20.

International Search Report dated Apr. 26, 2019, issued to the corresponding International Application No. PCT/US2019/020546.

* cited by examiner

METHOD AND NETWORK TO IMPLEMENT DECENTRALIZED VALIDATION AND AUTHENTICATION MECHANISMS TO PREVENT ADS-B CYBER-ATTACKS

BACKGROUND OF THE INVENTION

1. Field of the Invention

Aspects of the present invention relate to the field of aircraft surveillance and monitoring, particularly toward a process that may be used to augment Automatic Dependent Surveillance-Broadcast (ADS-B) systems by validating and authenticating ADS-B messages. Specifically, aspects of the present invention relate to using blockchain technology to transmit, distribute, and maintain an immutable ledger or record of communication transactions of all information exchanged using ADS-B between vehicles, thereby solving several cybersecurity vulnerabilities that exist in current state-of the-art systems.

2. Description of the Related Art

The Automatic Dependent Surveillance-Broadcast (ADS-B) concept provides for air and ground vehicles to periodically broadcast horizontal and vertical states (position and velocity) and other information such as flight identification and integrity or quality of the information contained in the broadcasted ADS-B message. Two types of ADS-B are currently approved by the Federal Aviation Administration (FAA)—a Universal Access Transceiver (UAT) at 978 MHz, and a Mode S transponder operating at 1090 MHz with Extended Squitter (1090ES). These ADS-B transceivers receive data from GPS and other modules onboard the aircraft, assemble the data into an ADS-B message, and broadcast to other aircraft and ground stations in range. Ground stations then re-transmit messages received from various aircraft using three services 1) Flight Information Service-Broadcast (or FIS-B, for NOTAMS and graphical weather up to 24,000 feet); 2) Traffic Information Service-Broadcast (TIS-B, for air traffic state information within a 15 nautical mile radius and 3500 feet of the ownship); and 3) ADS-Rebroadcast (ADS-R, for ADS-B information within a 15 nautical mile radius and 5000 feet of the ownship).

An ADS-B message containing state data (e.g., position, speed, and heading) of the ownship is automatically broadcast via ADS-B Out and then received via ADS-B In (for the same type of ADS-B). Accuracy and integrity of the state information is represented by various categories, such as navigation accuracy category for position and velocity (NACp and NACv), navigation integrity category (NIC), and the source integrity level (SIL) (see FAA document 80 FR 6899 incorporated herein by reference). Currently, integrity information related to the transmitting ADS-B may be added to the ADS-B device (as seen in U.S. Pat. No. 7,383,124 B1). Furthermore, ADS-B contains multiple broadcast rates for different pieces of state information. A 56-bit ADS-B message containing aircraft state information is included in every 112-bit 1090ES message. These 56 bits of ADS-B information and broadcast rates consist of airborne position squitter at 2 Hz, surface position squitter at 1 Hz, airborne velocity squitter at 2 Hz, and AC identification squitter at 0.2 Hz (see ICAO standard 9871 incorporated herein by reference). Currently, different manufacturers may provide other message lengths (e.g., 80 bit long ADS-B message) and may also encrypt the ADS-B message. In the current discussion, we will assume the standard 56 bit extended squitter ADS-B message, although the present concept can be applied to other ADS-B message lengths, formats and orders of individual fields within a message.

The current ADS-B message protocol lacks any scheme for the authentication of the identity of the vehicle or ground system that sent the message, broadcasts data without encryption by default, and is vulnerable to a variety of cyberattacks, allowing receivers of ADS-B broadcasts to accept faulty information, fake information and spoofed or duplicated data. Popular methods to improve the state of security in ADS-B can be organized into two broad areas—location verification and cryptographic authentication. Location verification techniques involve multi-lateration (using other independent systems like radar to verify state information of aircraft), and using independent models such as Kalman filtering, aircraft dynamics models (as in U.S. Pat. No. 7,495,612 B2), group verification (as in U.S. Pat. No. 9,052,375 B2), distance bounding, software and hardware fingerprinting and signal analysis, etc. These methods do not fix security issues of ADS-B itself, but simply verify information contained in the ADS-B messages using other surveillance hardware (such as Secondary Surveillance Radar, conventional or passive radar, or Traffic Information Service Broadcast system, found in U.S. Pat. No. 7,423,590 B2, CN103413463 B, U.S. Pat. No. 7,876,259 B2 and U.S. Pat. No. 7,570,214 B2) or mathematical trajectory models. Additionally, verification of an ADS-B message occurs only when aircraft or other vehicles are at a particular position on the runway or in the airspace such as for departing aircraft (as in U.S. Pat. No. 9,116,240 B2).

Several cryptographic authentication solutions have been suggested. Viggiano et al. (U.S. Pat. No. 7,730,307 B2) discuss a method for authenticating the identity of the aircraft alone by employing cryptographic methods as part of the authentication scheme. Here, a separate authentication monitoring system compares two secure codes—one generated by the monitoring system, and the other generated by the ADS-B transmitter. Each ADS-B message received must be independently validated using a comparison of the secret data (also known as password, passkey or secret key) by the authenticator system. Authentication by external servers, as described in US Pat. US20150212206 A1 also fall under this category. Other authentication systems such as TESLA, ECDSA and IBSMR (cited as references herein) use similar independent authentication schemes, and exchange security certificates to authenticate every transaction and every communication node. Due to the dynamic nature of nodes in range of one another in an ADS-B communication network, real time exchange of symmetric keys and verification is not possible. These methods allow receivers to verify messages, but certainly do not allow transmitters to generate authentic messages themselves. Furthermore, the entire authentication system can be "turned off", renders ADS-B transactions as a private channel of communication not useful to the aviation and research community, and is still vulnerable to cyberattacks involving flooding the ADS-B transponder with messages (Denial of Service attacks), posing as a false target (spoofing attack), listening in on unsecured broadcasts (passive eavesdropping), blocking a single communication node or an area in the airspace by beaming a sufficiently high power signal at that frequency (jamming attacks), changing transaction records during or post transmission (message injection and deletion attacks). While symmetric key cryptographic methods require the distribution of the secret key to every agent (thereby increasing the chances of leaking the secret key to a malicious agent), asymmetric key solutions depend on the idea of a centralized distribution of keys by authorities like the FAA through ADS-B, or other communication channels such as CPDLC (Controller Pilot Data Link Communication) or ACARS (Aircraft Communication Addressing and Reporting System), or Aircraft Situational Awareness Display to Industry or ASDI (see U.S. Pat. No. 7,612,716 B2).

Ironically, the solutions promising to provide cybersecurity to ADS-B involving location verification methods like multi-lateration negate the goal of replacing legacy technology like radar through direct reliance on secondary systems and models; and cryptographic methods often negate the goal of keeping ADS-B "open and accessible" in nature.

SUMMARY OF THE INVENTION

Therefore, what is needed are techniques that overcome the above-mentioned disadvantages. Specifically, aspects of this invention address several of the above mentioned cybersecurity vulnerabilities to enhance security of the ADS-B network by validating and authenticating ADS-B messages. Other features and advantages will be made apparent from the present specification. The teachings disclosed extend to those embodiments which fall within the scope of the appended claims, regardless of whether they accomplish one or more of the aforementioned needs.

Automatic Dependent Surveillance Broadcast (ADS-B) systems on-board aircraft can broadcast satellite based aircraft position and flight identification periodically, but suffer from cyber-security problems (most popularly, spoofing) due to the messages being unauthenticated and unencrypted by design. As a result, several passive and active cybersecurity attacks are possible and practically feasible for attackers with moderately sophisticated resources. A method that adds key verification and validation mechanisms to ADS-B via the use of blockchain and/or block DAG (Directed Acyclic Graph) technologies is discussed. This method treats each individual aircraft as a node in the dynamic, decentralized communication network, the National Airspace System (NAS), which receive or transmit whole or part of a distributed ledger containing ADS-B transactions and performing validation and authentication of ADS-B transactions by executing a consensus algorithm along with one or more other nodes. A node can also be a ground based server, IoT device, embedded computer or chip or a cloud based server that is modified to take part in the validation process. Transactions are grouped into blocks of the blockchain or blockDAG, and validated by multiple nodes in the network. This innovation does not suffer from features of existing suggestions to improve ADS-B security that are either impractical (digital signatures and certificates), not suitable considering low bandwidth, sparsely connected ADS-B network (distribution of keys), or that solve only a subset of security issues identified. Furthermore, this solution does not depend on other technologies that help solve some of these issues using multi-lateration. The solution guarantees high throughput of validated transactions into a distributed, open (or closed) ledger that can be implemented efficiently in ADS-B devices as well as ground stations. Aspects of this invention address major security issues in ADS-B networks such as loss of integrity, jamming and denial of service, eavesdropping, spoofing or impersonation, message replay and duplication and message modification, injection and duplication. According to an aspect of the present invention, there is a method to ensure ADS-B message security by implementing a distributed ledger for protecting validity and authenticity of ADS-B transactions within a network having a plurality of nodes, one or more nodes performing the method comprising:

receiving a whole or part of the distributed ledger containing one or more blocks of the ADS-B transactions by a validation module, each block comprising a set of states and other information pertaining to one of the other nodes in the network;

appending the whole or part of the distributed ledger to an existing local copy of the distributed ledger to create an unvalidated updated local copy of the distributed ledger;

broadcasting the updated local copy of the distributed ledger to the other nodes;

implementing a consensus algorithm to validate and authenticate the updated local copy of the distributed ledger;

broadcasting whole or part of the validated and authenticated updated local copy to other ones of the nodes in ADS-B range, and receiving from the other ones of the nodes their whole or part of the validated and authenticated updated local copy; and replacing whole or part of the existing local copy of the distributed ledger with at least a part of the received whole or part of the validated and authenticated local copy of the distributed ledger.

According to an aspect of the present invention, there is a network to ensure ADS-B message security by implementing a distributed ledger for protecting validity and authenticity of ADS-B transactions within the network, comprising:

a plurality of nodes, wherein each of at least one of the nodes comprising:
  a receiver receiving a whole or part of the distributed ledger containing one or more blocks of the ADS-B transactions, each block comprising a set of states and other information pertaining to one of the other nodes in the network;
  a validation module appending the whole or part of the distributed ledger to an existing local copy of the distributed ledger to create an unvalidated updated local copy of the distributed ledger;
  a transmitter broadcasting the updated local copy of the distributed ledger to the other nodes;
  wherein:
  the validation module implements a consensus algorithm to validate and authenticate the updated local copy of the distributed ledger;
  the transmitter broadcasts whole or part of the validated and authenticated updated local copy to other ones of the nodes in ADS-B range, and the receiver receives from the other ones of the nodes their whole or part of the validated and authenticated updated local copy; and
  the validation module replaces whole or part of the existing local copy of the distributed ledger with at least a part of the received whole or part of the validated and authenticated local copy of the distributed ledger.

According to an aspect of the present invention, there is a non-transitory machine-readable medium storing a non-transitory, tangible computer program product comprising computer program code which when executed causes a validation module in at least one node of a network to perform operations comprising:

appending a whole or part of the distributed ledger to an existing local copy of the distributed ledger to create an unvalidated updated local copy of the distributed ledger, in response to receiving the whole or part of the distributed ledger containing one or more blocks of ADS-B transactions within the network, each block comprising a set of states and other information pertaining to one of the other nodes in the network;

implementing a consensus algorithm to validate and authenticate the updated local copy of the distributed ledger based upon receiving from the other ones of the nodes their whole or part of the validated and authenticated updated local copy; and replacing whole or part of the existing local copy of the distributed ledger with at least a part of the received whole or part of the validated and authenticated local copy of the distributed ledger. Additional aspects and/or advantages of the invention will be set forth in part in the description which follows and, in part, will be obvious from the description, or may be learned by practice of the invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings. The embodiments are described below in order to explain the present invention by referring to the figures. The present invention is illustrated by way of example and not limitation in the figures of the accompanying drawings in which like references indicate similar elements.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

It should be noted that any language directed to a computer or node should be read to include any individual, or suitable combination of computing devices used on ground systems, aircraft, other vehicles and the cloud, servers, interfaces, systems, databases, and other type of computing devices or parts that operate individually or collectively, and that may exchange data with other components or systems.

One should appreciate that the disclosed method(s) herein may refer to blockchain technologies as a whole, which include various implementations of blockchain, blockDAGs (Directed Acyclic Graphs), ledgers, hyperledgers, distributed ledgers, and related distributed database management and dissemination technologies. One such variation, as an example of interest, is achieving the same goals as described herein, but describing connected aircraft as Internet of Things (IoT) devices. Methods described in other applications involving IoT devices do not consider the message transmission rate, the limited number of characters allowed in an ADS-B message as per published standards, and the fact that the ADS-B network is dynamic since it depends on what nodes are in ADS-B range of the ownship (i.e., the aircraft in question). Distributed ledger systems described herein can be permissioned or permissionless, private or public, and may involve homogenous nodes with similar computing capacity or heterogeneous nodes that act as groups, pools or consortiums that own a significant portion of the computing capacity of the network. Related technologies today are being pushed to reach real-world application requirements, such as that demanded by the class of applications described herein including low latency and high throughput of transactions.

The following discussion provides example embodiments referring to the inventive subject matter. Other minor variations including communication between different types of vehicles, aircraft, ground systems, broadcast and re-broadcast systems, and combinations thereof, using ADS-B to transmit and receive state information are also considered to be included, even if not explicitly disclosed. In the following discussion, vehicles (such as aircraft) or ground stations can be referred to as nodes that contain an ADS-B device (usually a combination of ADS-B in and ADS-B out for receiving and transmitting ADS-B messages). Nodes in ADS-B range of each other for a temporary network. Neighboring nodes in a network are called "peers". Since the network is formed due to a collection of nodes being in ADS-B range, the network itself is dynamic. An ADS-B "message" can refer to content created in the ADS-B device (in the ADS-B message format) which contains aircraft state information and identity information. On the other hand, an ADS-B "transaction" contains the ADS-B message, as well as time-stamps and information identifying the sender and the receiver. A collection of these transactions is referred to as a "block", which is also usually timestamped. A block is connected to a previous block using a cryptographic hash. As new blocks are formed, they form a chain or a DAG.

Figure 1:
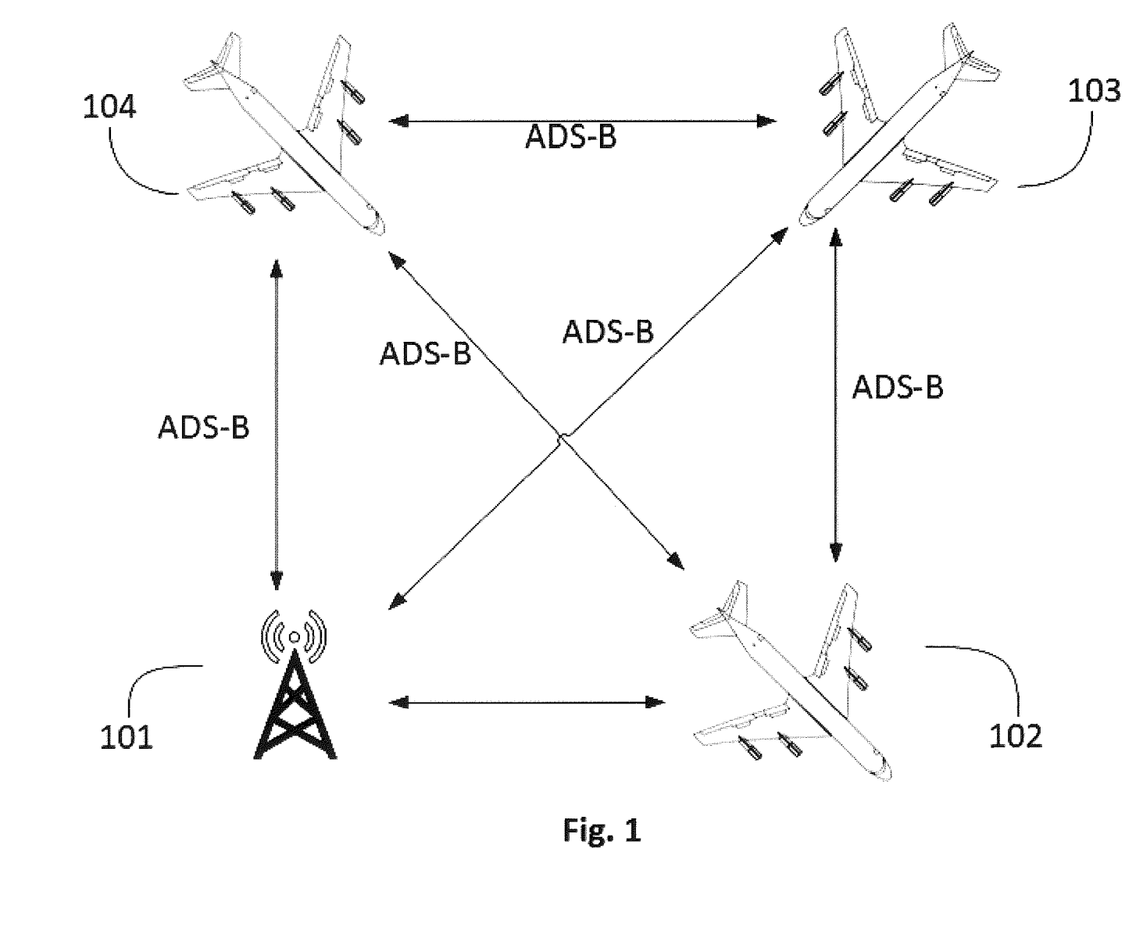
FIG. 1 illustrates a schematic overview of an ad-hoc ADS-B communication network involving ADS-B equipped aircraft and a ground station.
Figure 3:
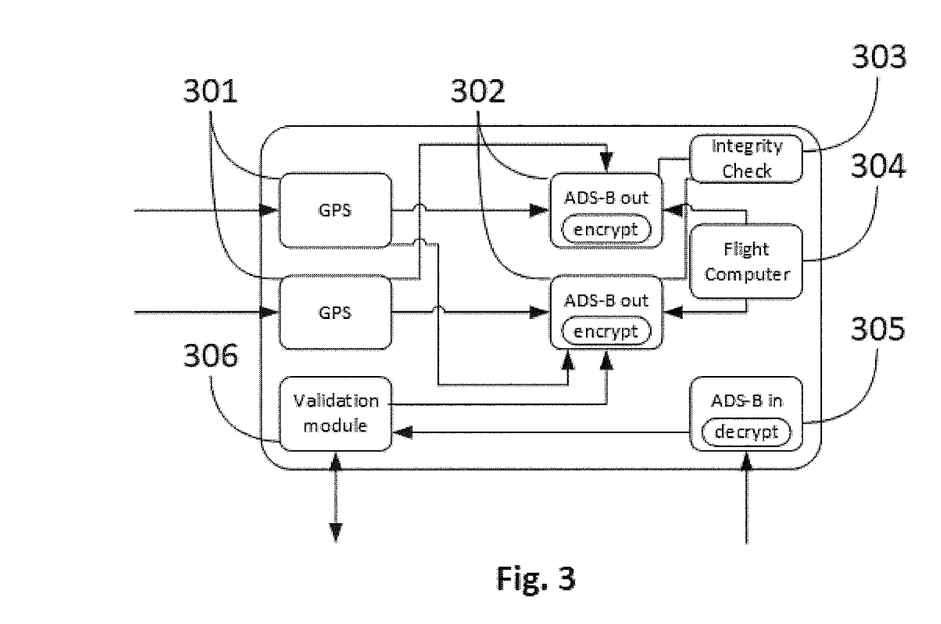
FIG. 3 shows a schematic of various components in a vehicle or ground based computer system including a validation module that is used to validate the integrity and authenticity of ADS-B transactions along with a group of other consensus nodes, in accordance with an embodiment of the present invention.

FIG. 1 illustrates an overview of an ad-hoc ADS-B network that has been formed due to three aircraft 102, 103 and 104 and a ground station 101 (with each of the three aircraft 102-104 and ground station 101 being also referred to as nodes0 in ADS-B range of each other. The aircraft 102, 103, and 104 contain ADS-B devices that are broadcasting ADS-B messages to other nodes in ADS-B range, which also includes the ADS-B ground station 101. In the current example, a fully connected network is shown wherein all nodes that are broadcasting ADS-B information are connected or in range of all other nodes. It is well understood that the present concept applies to other situations with any number of aircraft, ground stations, other types of nodes including, but not limited to, independent ground based servers, IoT devices, embedded computers or chips or a cloud based server. In addition, one should consider the network as dynamic or ad-hoc. The lines with double-arrows between nodes are "links"; two nodes that are connected by a link are in ADS-B range of each other. The present concept also applies to networks that are not fully connected (i.e., where all nodes are not connected to all other nodes directly via links but are connected indirectly through other nodes). It is possible to have multiple, isolated groups of nodes, thereby forming multiple "local" networks. All local networks may join each other to form one large "global" network. The present concept applies directly to local networks, but also allows for local networks to join other local networks to form a larger, global network. If two or more local networks are isolated (not connected in any way with each other), these local networks will maintain local copies of authenticated and validated ADS-B transactions at the end of the method described in the following paragraphs. The nodes that form local and global networks may not all participate in the verification and validation process presented herein. Nodes that perform validation include a validation module 306, such as shown in FIG. 3, which verify every transaction between peers in the network. All transactions form an immutable ledger of information that can be represented as a block Directed Acyclic Graph (DAG), of which a block chain is an example. One or more, but not necessarily all of the nodes, are required to participate in the validation process. A non-transitory machine-readable medium stores a non-transitory, tangible computer program product comprising computer program code which when executed is arranged to perform any of the following methodologies of the validation module 306. The non-transitory machine-readable medium may reside in the validation module 306 or external thereto.

Figure 2:
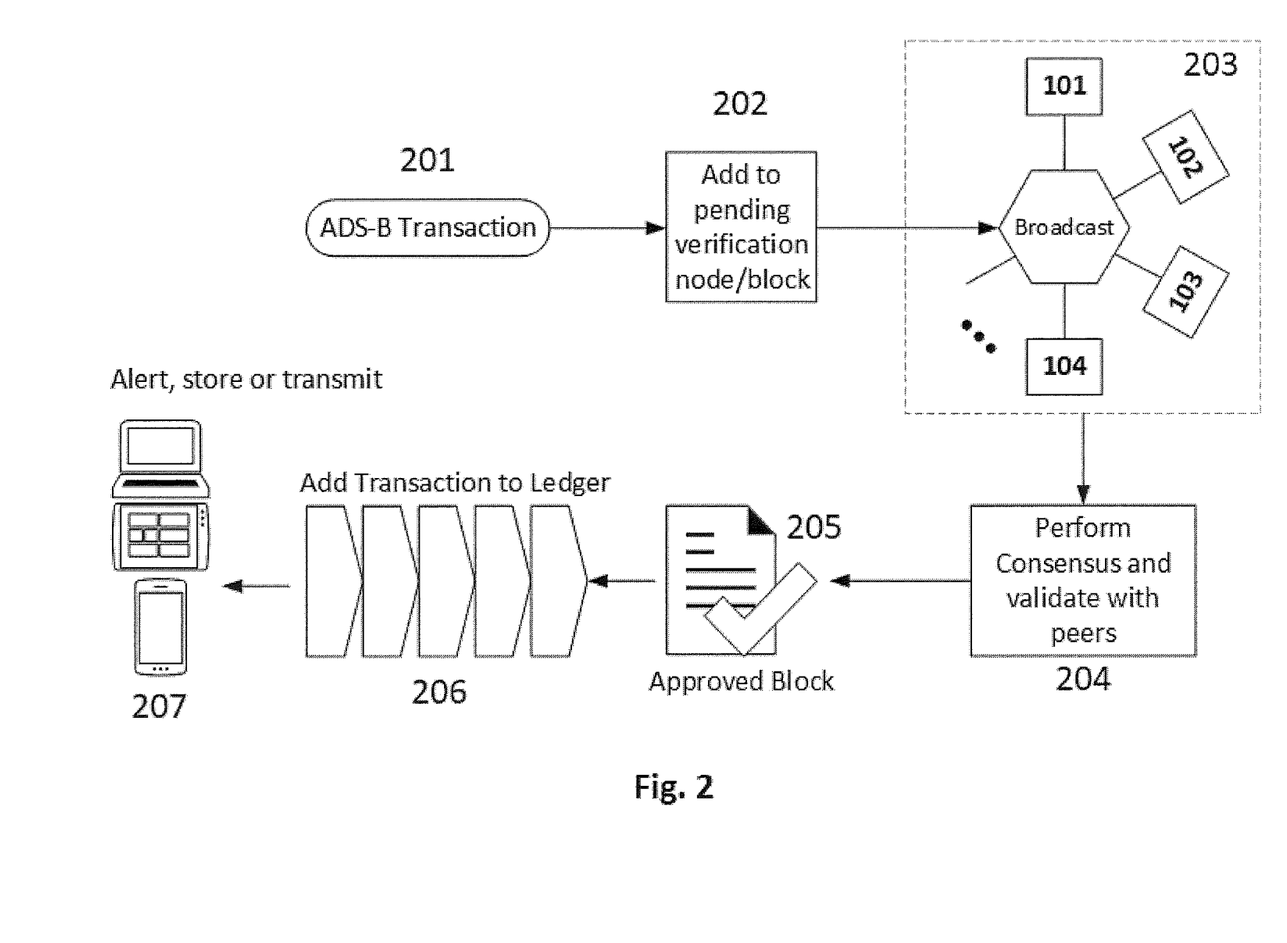
FIG. 2 illustrates a method of validating an ADS-B transaction using distributed onboard computing on vehicles and ground station(s) shown in FIG. 1.

Through the operations 201-207 described next, nodes independently verify each new block of unverified transactions. After the operations 201-207 are done, the network has reached "consensus", meaning all nodes in the network have the same local blockchain or blockDAG, and may now use this verified information.

FIG. 2 illustrates a procedure used to validate the integrity and authenticity of ADS-B transactions 201 in a local network, such as in the present embodiment, the network of nodes comprising aircraft 102-104 and the ground station 101. The process begins when there is a new ADS-B transaction 201 to be verified by the nodes 102-104 in the network. No decision to use or display the information received through this ADS-B message or transaction is to be made yet, since it is still unverified and may be a result of any of the afore-mentioned cyberattacks. Each node 101-104 in the network adds the transaction to a new block, or an existing block 202 with other pending transactions. This is a local copy of the block of transactions that resides in the validation module 306 shown in FIG. 3, within each node 101-104, and the network has not reached consensus yet. Nodes 101-104 in the network receive or "discover" whole or part of the distributed ledger containing one or more blocks from other nodes via a broadcast 203 to other nodes in the network, and then append this to an existing local copy of the distributed ledger; this allows nodes 101-104 to update their own local copies of the ledger. In popular blockchain and similar literature, this discovery process followed by resolution is called "mining". The updated local copy of the ledger contains one or more blocks of unverified transactions. Nodes 101-104 in the network independently validate and authenticate these blocks, that are form the received whole or part of the distributed ledger using consensus rules 204. The result of performing consensus in 204 is one or more validated and authenticated blocks of transactions 205 that are approved by each node for validity and authenticity. Nodes 101-104 then replace whole or part of the existing local copy of the distributed ledger with at least a part of the received whole or part of the validated and authenticated local copy of the distributed ledger 206. Other implementations of this core concept may also include rebroadcasting (through 203) blocks of verified transactions to the network, or unique IDs identifying verified transactions, which may improve the confidence or degree of verification attributed to a block of transactions as a greater number of nodes in the network independently verify the same block. This rebroadcasting of the validated block may be performed using available on-board, or ground based, communication technology that includes one of ADS-B communication, radio communication and WiFi communication. Finally, each node 101-104 can use information from new validated and authenticated transactions 206 (e.g., position of a neighboring aircraft) by storing or transmitting the validated and authenticated transactions or detecting information about a nature of a cybersecurity attack, and alerting 207 at least one of the nodes based upon the consensus algorithm failing to validate and authenticate the updated local copy of the distributed ledger. Depending on the consensus algorithm used, it may or may not be relevant to exactly replicate the local ledger of another node since a node may only be interested in a small set of latest validated transactions.

Note that information regarding verified blocks of transactions may be broadcast as another ADS-B message, or through separate communication channels as discussed in other work referred to within this document. As a reminder, several messages including various combinations of state information are broadcast at various intervals (2 Hz, 1 Hz, 0.5 Hz etc.). Custom ADS-B devices that include a validation module 306 (or other modules performing the function of the validation module 306 described herein) may even be tuned to broadcast information regarding verified blocks at other intervals and other frequencies. In order to incentivize nodes to take part in this process, nodes 101-104 are often rewarded with cryptocurrency in popular applications related to blockchain today. While this is standard practice, the incentive in the current application is simply to transmit and receive information in an open network, while also being invulnerable to various cyberattacks.

Nodes 101-104 taking part in the validation and consensus process 204 may also be transmitting state information at other transmission intervals. Various copies of local blocks of transactions may be received from nodes in the network, and therefore there is a need to resolve these discrepancies and reach a consensus regarding the "true" set of transactions. This true set of transactions is a verified set of transactions agreed upon by multiple nodes in the network. Consensus protocols contained in 204 and executed by the group of participating nodes 101-104 have two functions—one, to ensure that the next block in the chain is the one and only version of the true set of transactions; and two, prevents malicious agents from modifying the block. Due to the nature of blockDAGs being immutable, adding a false transaction or removing/modifying a block will involve broadcasting a "false" local copy of the distributed ledger to peers in the network. Given assumptions in the consensus algorithms used, difficulty of achieving block modification may vary. Examples of consensus algorithms referred to here include but are not limited to the following—proof of work, proof of stake, proof of activity, proof of burn, proof of capacity, proof of elapsed time, SIEVE consensus protocol, Cross-fault tolerance, byzantine fault tolerance, and other variants or combinations thereof. What is important to note here is that a consensus is reached regarding the "true" set of transactions using a consensus algorithm that suits network size, participation, as well as link and node characteristics. This leads to an approved block of transactions 205. The new block of transactions is added to the local copy of the DAG or ledger 206, which now contains only validated transactions. Any decisions to use or display information contained within the approved set of transactions can be made now with the confidence that transactions and information contained therein are verified as shown in steps 201 to 207 by multiple participants and contains only validated and authenticated transactions. Validated and authenticated transactions may be tagged as "trusted" transactions if one or more nodes have already independently validated that block. Blocks of transactions or ADS-B messages can be encrypted to introduce additional security.

This blockDAG or blockchain based system is therefore a distributed system with a shared true state that is a result of the distributed consensus algorithm used. The procedure described provides a method to validate and authenticate other aircraft's and ground stations' broadcasts, avoids denial of service attacks (since one malicious node attempting to repeatedly add new "false" transactions will be easily removed in the consensus step), prevents eavesdropping (since all messages in the block are encrypted by design, prevents spoofing or impersonation or ghosting (since these "false" messages are filtered out of the shared true state or ledger information), completely avoids possibility of message replay, insertion, deletion, and manipulation (since blockDAGs are immutable). The procedure described can also be used to augment exiting solutions.

FIG. 3 shows a top level connectivity of some components in a node that participates in the validation process 204. The node contains a collection of components including but not limited to GPS modules 301, a flight computer 304, an integrity or quality check module 303, ADS-B out 302 and ADS-B in 305 and a validation module 306. Another type of transmitter other than ADS-B, and another type of receiver other than an ADS-B in may be utilized in this instance. These modules may be implemented in various kinds of hardware (including, but not limited to, chips, CPUs, GPUs, FPGAs, ASICs, DSP, APU, and any other capable processing component) that are all treated as "processing elements" in our discussion. These processing elements may be singular or plural. The processing element may use volatile or non-volatile storage or memory including but not limited to ROM, RAM, SDRAM, DRAM, SRAM, flash Memory, MRAM, D-RAM or P-RAM. The validation module contains software code, or a non-transitory machine readable medium comprising instructions that, when executed by a validation module of a node in a network, causes the validation module to perform operations 201, 202, 204-207. The ADS-B out module 302 encodes relevant state information into the ADS-B format, following which may or may not encrypt the message before transmitting. ADS-B in module 105 on receiving nodes 101-104 may need to be decrypted, and passed on to validation or consensus module(s) 306 present in the receiving node. Similarly, the ground station 101 may contain ADS-B transceivers with dedicated computing components that participate in the validation process. In fact, for low bandwidth environments, the ground station 101 may preferably choose to provide more computation resources to validate transactions, compared to on-board computers on the aircraft 102-104 or other equipment containing embedded or dedicated processors.

Figure 4:
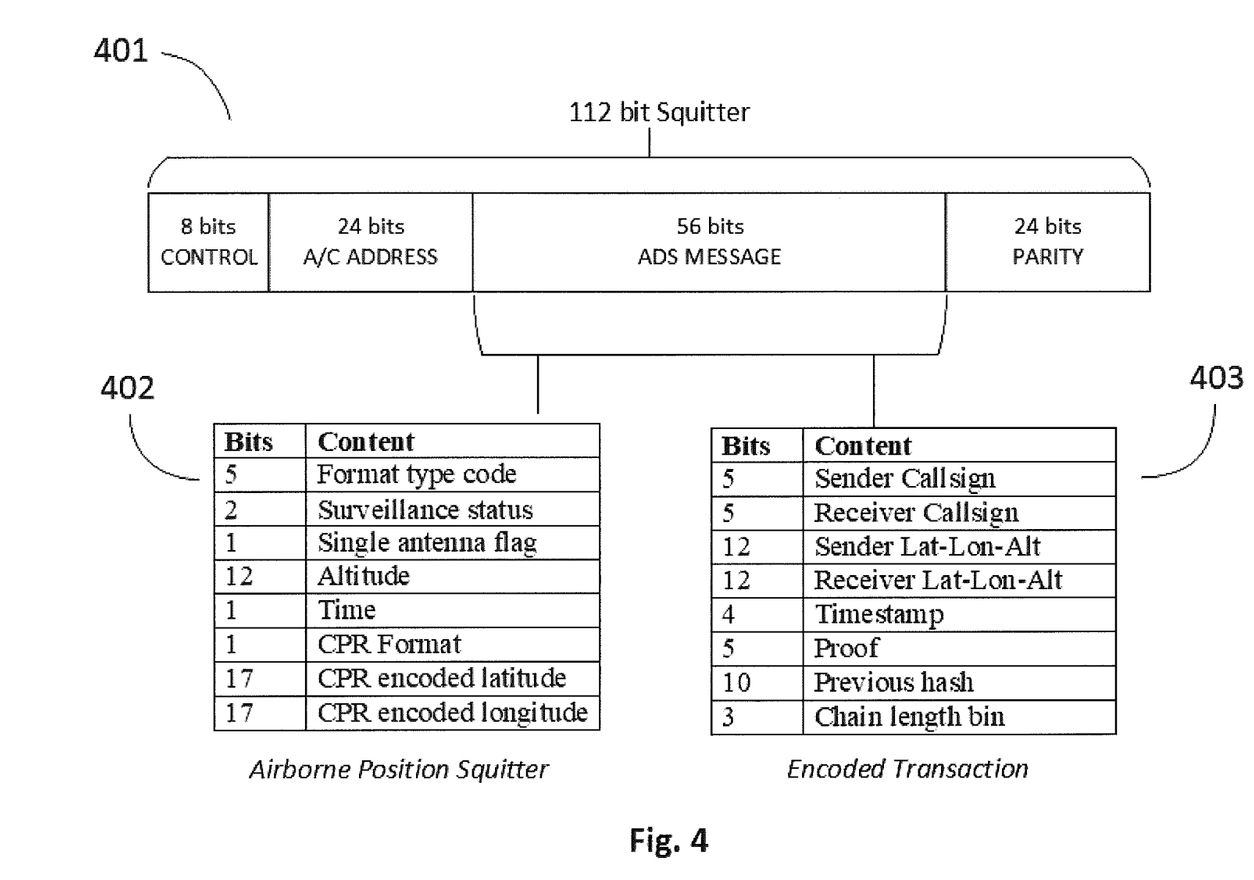
FIG. 4 shows the difference between a 56 bit ADS-B message containing airborne position information, and a message of the same length containing transaction information to be verified using the process described in FIG. 2.

FIG. 4 describes specifically how the validation module 306 introduced in FIG. 3 may assemble ADS-B transactions that are to be validated. As mentioned earlier, a current ADS-B Extended Squitter (ES) message (shown schematically in 401) is 112 bits in length. The first 8 bits (called "Control" bits) contain information about the downlink format (5 bits) and the transponder capability subtype (3 bits), both not important for the current discussion. These 8 bits are also unencrypted so that the receiver identifies the message type (such as "position report" type message). The next 24 bits are reserved for the aircraft address or ID. The next 56 bits holds important information about the state of each aircraft 102-104. This information may be an airborne position squitter (as shown in 402), a surface position squitter, airborne velocity squitter, or an identification squitter. Each of these message types may be transmitted at various rates (1 per second, 2 per second, etc.) via the same communication frequency (e.g., 1090 MHz). The validation process introduces new message types (hereafter referred to collectively as "Encoded Transaction" or ET. The 56 bit ET shown in 403 is simply an example, and can be thought of as a stand-in for other content used in the validation process described in the previous sections using FIGS. 1-3. In this example, the ET contains a transaction to be verified, referred to, by way of example, as a collection of sender and receiver callsigns (in this example 5 bits each), an encoded and compressed collection of latitude, longitude and altitude data of the sender and the receiver nodes, a time stamp, proof (may be empty in a unverified and not-yet-validated message, but non-empty in a validated transaction), a 10 bit previous hash code and a 3 bit section that provides either the length of the candidate chain or list of transactions to be added, or the total chain length so far. For the uninitiated, a hash is an encrypted version of an individual or list of payloads, transactions or messages. A proof is a number or string of letters that depends on each message, that proves that the sender is genuine, that it has taken part in validation before, and contains the same consensus protocol that the other nodes in the network run, so that the other nodes may verify that the sender has done some work before proposing a new message or transaction to the network as a true transaction. Note that many consensus mechanisms used in blockchain and blockDAG reference previous transactions and the associated hashes, and this brings up the question of the first hash—this first hash can be arbitrary, or set by a central agency (like the FAA) and may be refreshed from time to time. In other words, the validation module 306 may be required to create a local copy of the distributed ledger by generating a first hash with arbitrary or system defined token information to be later used in validating and authenticating the updated local copy of the distributed ledger. Also, note that the specifics of bit length and field types or names are not important, but it is sufficient to know that a recorded transaction to be verified is being broadcast with either a request for validation by peers, or as a validated (or invalidated message). The ET is assembled by the validation module 306 in FIG. 3, and then broadcast out to neighboring nodes via the ADS-B out module 302. The receiving node receives this ET through its ADS-B in module 305, and begins the consensus process in the receiving node's validation module 306. The validation module 306 present in each receiving node collects the encoded ET, decodes and/or decrypts the ET and now has access to the various fields of the ET shown in 403. Each node 101-104 maintains a ledger of received transactions locally. The goal of consensus is to replicate this ledger individually in all nodes participating in the network. In our explanatory example, let us assume that the "consensus" algorithm run by each validation module 306 performs two checks—one, does the received message have a longer length of validated transactions than its local copy of the ledger; and two, does the received message also have some proof that the sender node has taken part in validating the current message or other messages in the list of transactions. The reader must acknowledge that there are several other currently used consensus algorithms, such as the ones listed in this document and others that may be far more appropriate for blockchain and/or blockDAG message verification and validation than the current two-step verification algorithm. In our explanatory example, the receiver may "verify" a message, if the sender node has received validation from other nodes or has validated the message before sending, or the receiver node may "validate" a new message along with peers. As more nodes take part in the process of individually verifying and validating each message, more confidence can be associated with the contents of that message. The confidence level collected so far can also be a field in the ET transmitted to other nodes.

A "good" message from a participating node that is not malicious will be sent to neighboring nodes; each receiver node uses the consensus protocol described above and performs the two step verification—one, the receiver decides that the sender's chain length is greater than the length of its local copy (this means that it is highly likely that the sender has the list of validated transactions in the receiver's local ledger, plus another new transaction to be validated); and two, it verifies the message using the proof and previous hash. If the same algorithm is running on the sender node's validation module 306, it will generate the same proof and previous hash as the receiver node. If the validation is successful, the entire list of transactions is used to generate a new proof and hash, and broadcast to other nodes. A "bad" message from a malicious agent will not contain a proof (since this malicious agent did not take part in previous validations) and may not contain the correct length of the list of transactions in its local ledger, which is likely to be falsified or stolen.

Once a block of transactions is validated using consensus 204, an aircraft 102, 103 or 104 can also send a different "response" message within the 56 bits allowable providing a single validated transaction, or a group of validated transactions with a flag indicating whether or not each transaction in the group was validated or not. Some examples of current applications of blockchain require a majority of nodes participating in the network to validate the messages for placing higher confidence in the validity of each transaction. Recent advances in blockDAG technology (sometimes known as tangle) provides a framework wherein each transaction to be verified references two other verified transactions in the DAG (references cited herein). This allows higher throughput of verifying transactions, and also allows operation in a dynamic network where each node may leave a local network and join another neighboring local network; in this case, a node (such as an aircraft) that leaves the local network will only begin interacting with nodes in the new network after it has contributed locally to the new network by validating two of the network's latest transactions. Thus, validating two previous transactions in the current local network of the node will obviate the need to merge two ledgers that have been accumulating records containing local transactions only. A naïve implementation of blockchain may include fusing several versions of the ledger coming from various local networks that merge into a larger network. This method has problems related to duplicate transactions in ledgers, but newer implementations such as IOTA Tangle may be more suitable for the application described herein. In addition, the 56 bit message may be encrypted with a fixed length encryption algorithm like FFX (references cited herein) before assembling the ET in the validation module. Lastly, ET messages may also be assembled in parts, 56 bits at a time and sent to receiver nodes via multiple successive transactions. This may delay the verification and validation functions, but will help secure transactions and provide receiving nodes with higher levels of confidence associated with a transaction, at which point that transaction can be used to in an internal decision at the receiver node in other business logic or safety critical functions.

As noted above, the present invention significantly improves the security of ADS-B transactions by working to maintain a validated ledger of ADS-B transactions. Nodes that use validated information from this ledger have improved security against common cybersecurity attacks including but not limited to denial of service attacks, jamming attacks, spoofing attacks, flooding attacks and eavesdropping.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method to ensure ADS-B message security by implementing a distributed ledger for protecting validity and authenticity of ADS-B transactions in an ADS-B range in an ADS-B communication network having a plurality of nodes, one or more of the nodes performing the method comprising:

receiving a whole or part of the distributed ledger containing one or more blocks of the ADS-B transactions in the ADS-B range via the ADS-B communication network by a validation module, each block comprising a set of states and other information pertaining to one of the other nodes in the ADS-B communication network;

appending the whole or part of the distributed ledger to an existing local copy of the distributed ledger to create an unvalidated updated local copy of the distributed ledger;

broadcasting the updated local copy of the distributed ledger to the other nodes;

implementing a consensus algorithm to validate and authenticate the updated local copy of the distributed ledger;

broadcasting whole or part of the validated and authenticated updated local copy to other ones of the nodes in the ADS-B range, and receiving from the other ones of the nodes their whole or part of the validated and authenticated updated local copy; and     replacing whole or part of the existing local copy of the distributed ledger with at least a part of the received whole or part of the validated and authenticated local copy of the distributed ledger.

2. The method of claim 1, further comprising:
creating a local copy of the distributed ledger by generating a first hash with arbitrary or system defined token information to be used in validating and authenticating the updated local copy of the distributed ledger.

3. The method of claim 1, wherein the nodes comprise at least one of a vehicle, a ground based server, an IoT device, an embedded computer or chip, and a cloud based server.

4. The method of claim 1, further comprising:
detecting information about a nature of a cybersecurity attack, and alerting at least one of the nodes based upon the consensus algorithm failing to validate and authenticate the updated local copy of the distributed ledger.

5. An ADS-B communication network to ensure ADS-B message security by implementing a distributed ledger for protecting validity and authenticity of ADS-B transactions in an ADS-B range in the ADS-B communication network, comprising:
a plurality of nodes, wherein each of at least one of the nodes comprising:
a receiver receiving a whole or part of the distributed ledger containing one or more blocks of the ADS-B transactions in the ADS-B range via the ADS-B communication network, each block comprising a set of states and other information pertaining to one of the other nodes in the ADS-B communication network;
a validation module appending the whole or part of the distributed ledger to an existing local copy of the distributed ledger to create an unvalidated updated local copy of the distributed ledger;
a transmitter broadcasting the updated local copy of the distributed ledger to the other nodes in the ADS-B range via the ADS-B communication network;
wherein:
the validation module implements a consensus algorithm to validate and authenticate the updated local copy of the distributed ledger;
the transmitter broadcasts whole or part of the validated and authenticated updated local copy to other ones of the nodes in the ADS-B range, and the receiver receives from the other ones of the nodes their whole or part of the validated and authenticated updated local copy; and
the validation module replaces whole or part of the existing local copy of the distributed ledger with at least a part of the received whole or part of the validated and authenticated local copy of the distributed ledger.

6. The ADS-B communication network of claim 5, wherein the validation module:
creates a local copy of the distributed ledger by generating a first hash with arbitrary or system defined token information to be used in validating and authenticating the updated local copy of the distributed ledger.

7. The ADS-B communication network of claim 5, wherein the nodes comprise at least one of a vehicle, a ground based server, an IoT device, an embedded computer or chip, and a cloud based server.

8. The ADS-B communication network of claim 5, wherein the validation module:
detects information about a nature of a cybersecurity attack, and alerts at least one of the nodes based upon the consensus algorithm failing to validate and authenticate the updated local copy of the distributed ledger.

9. A node to ensure ADS-B message security by implementing a distributed ledger for protecting validity and authenticity of ADS-B transactions in an ADS-B range in an ADS-B communication network comprising a plurality of nodes, the node comprising:
a receiver receiving a whole or part of the distributed ledger containing one or more blocks of the ADS-B transactions in the ADS-B range via the ADS-B communication network, each block comprising a set of states and other information pertaining to one of the other nodes in the ADS-B communication network;
a validation module appending the whole or part of the distributed ledger to an existing local copy of the distributed ledger to create an unvalidated updated local copy of the distributed ledger;
a transmitter broadcasting the updated local copy of the distributed ledger to the other nodes in the ADS-B range via the ADS-B communication network;
wherein:
the validation module implements a consensus algorithm to validate and authenticate the updated local copy of the distributed ledger;
the transmitter broadcasts whole or part of the validated and authenticated updated local copy to other ones of the nodes in the ADS-B range, and the receiver receives from the other ones of the nodes their whole or part of the validated and authenticated updated local copy; and
the validation module replaces whole or part of the existing local copy of the distributed ledger with at least a part of the received whole or part of the validated and authenticated local copy of the distributed ledger.

10. The node of claim 9, wherein the validation module:
creates a local copy of the distributed ledger by generating a first hash with arbitrary or system defined token information to be used in validating and authenticating the updated local copy of the distributed ledger.

11. The node of claim 9, wherein the nodes comprise at least one of a vehicle, a ground based server, an IoT device, an embedded computer or chip, and a cloud based server.

12. The node of claim 9, wherein the validation module:
detects information about a nature of a cybersecurity attack, and alerts at least one of the nodes based upon the consensus algorithm failing to validate and authenticate the updated local copy of the distributed ledger.

13. A non-transitory machine-readable medium storing a non-transitory, tangible computer program product comprising computer program code which when executed causes a validation module in at least one node of an ADS-B communication network to perform operations comprising:
appending a whole or part of the distributed ledger to an existing local copy of the distributed ledger to create an unvalidated updated local copy of the distributed ledger, in response to receiving the whole or part of the distributed ledger containing one or more blocks of ADS-B transactions in an ADS-B range via the ADS-B communication network, each block comprising a set of states and other information pertaining to one of the other nodes in the ADS-B communication network;
implementing a consensus algorithm to validate and authenticate the updated local copy of the distributed ledger based upon receiving from the other ones of the nodes their whole or part of the validated and authenticated updated local copy; and
replacing whole or part of the existing local copy of the distributed ledger with at least a part of the received whole or part of the validated and authenticated local copy of the distributed ledger.

14. The non-transitory machine-readable medium of claim 13, wherein the operations further comprise:
creating a local copy of the distributed ledger by generating a first hash with arbitrary or system defined token information to be used in validating and authenticating the updated local copy of the distributed ledger.

15. The non-transitory machine-readable medium of claim 13, wherein the operations further comprise:
detecting information about a nature of a cybersecurity attack, and alerting at least one of the nodes based upon the consensus algorithm failing to validate and authenticate the updated local copy of the distributed ledger.

* * * * *